(12) United States Patent
Hirata et al.

(10) Patent No.: US 11,914,407 B2
(45) Date of Patent: Feb. 27, 2024

(54) FLOW RATE CONTROL DEVICE

(71) Applicant: FUJIKIN INCORPORATED, Osaka (JP)

(72) Inventors: Kaoru Hirata, Osaka (JP); Keisuke Ideguchi, Osaka (JP); Shinya Ogawa, Osaka (JP); Katsuyuki Sugita, Osaka (JP); Masaaki Nagase, Osaka (JP); Kouji Nishino, Osaka (JP); Nobukazu Ikeda, Osaka (JP); Hiroyuki Ito, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 17/605,948

(22) PCT Filed: Apr. 16, 2020

(86) PCT No.: PCT/JP2020/016674
§ 371 (c)(1),
(2) Date: Oct. 22, 2021

(87) PCT Pub. No.: WO2020/218138
PCT Pub. Date: Oct. 29, 2020

(65) Prior Publication Data
US 2022/0197316 A1 Jun. 23, 2022

(30) Foreign Application Priority Data
Apr. 25, 2019 (JP) .................................. 2019-083562

(51) Int. Cl.
*G05D 7/06* (2006.01)
*G01L 13/06* (2006.01)
(Continued)

(52) U.S. Cl.
CPC ........... *G05D 7/0635* (2013.01); *G01F 1/363* (2013.01); *G01F 15/005* (2013.01); *G01L 13/06* (2013.01);
(Continued)

(58) Field of Classification Search
CPC . Y10T 137/7761; G05D 7/0635; G01L 13/06; G01L 19/08; G01F 1/363; G01F 15/005
(Continued)

(56) References Cited

U.S. PATENT DOCUMENTS

| 4,782,703 A | * | 11/1988 | Nishi | .................... G01L 13/025 73/717 |
| 5,816,285 A | * | 10/1998 | Ohmi | ................... G05D 7/0635 137/486 |

(Continued)

FOREIGN PATENT DOCUMENTS

| JP | 2004-138425 A | 5/2004 |
| JP | 4204400 B2 | 1/2009 |

(Continued)

OTHER PUBLICATIONS

International Search Report issued in PCT/JP2020/016674; dated Jul. 7, 2020.

*Primary Examiner* — William M McCalister
(74) *Attorney, Agent, or Firm* — Studebaker & Brackett PC

(57) ABSTRACT

The flow rate control device 10 includes a control valve 11, a restriction part 12 provided downstream of the control valve 11, an upstream pressure sensor 13 for measuring a pressure P1 between the control valve 11 and the restriction part 12, a differential pressure sensor 20 for measuring a differential pressure ΔP between the upstream and the downstream of the restriction part 12, and an arithmetic control (Continued)

circuit 16 connected to the control valve 11, the upstream pressure sensor 13, and the differential pressure sensor 20.

2 Claims, 9 Drawing Sheets

(51) Int. Cl.
    *G01F 15/00*     (2006.01)
    *G01F 1/36*     (2006.01)
    *G01L 19/08*     (2006.01)

(52) U.S. Cl.
    CPC ......... *G01L 19/08* (2013.01); *Y10T 137/7761* (2015.04)

(58) Field of Classification Search
    USPC ...................................................... 137/487.5
    See application file for complete search history.

(56) References Cited

U.S. PATENT DOCUMENTS

| | | | | |
|---|---|---|---|---|
| 5,865,205 | A * | 2/1999 | Wilmer | G05D 7/0635 73/1.16 |
| 6,119,710 | A * | 9/2000 | Brown | G01F 1/88 137/486 |
| 6,216,726 | B1 * | 4/2001 | Brown | G01F 1/88 137/486 |
| 6,289,923 | B1 * | 9/2001 | Ohmi | G05D 7/0635 251/118 |
| 6,539,968 | B1 * | 4/2003 | White | G05D 7/0635 138/44 |
| 6,581,623 | B1 * | 6/2003 | Carpenter | F17C 9/00 137/115.03 |
| 7,059,363 | B2 * | 6/2006 | Sugiyama | G05D 7/0664 141/192 |
| 7,143,774 | B2 * | 12/2006 | Lull | G05D 11/132 137/486 |
| 8,944,095 | B2 * | 2/2015 | Okabe | C23C 16/45561 137/486 |
| 10,054,959 | B2 * | 8/2018 | Somani | G01F 15/005 |
| 10,534,376 | B2 * | 1/2020 | Nishino | G05D 7/0641 |
| 10,921,828 | B2 * | 2/2021 | Ando | G05D 7/0652 |
| 10,996,689 | B2 * | 5/2021 | Yasuda | G01F 1/48 |
| 11,079,774 | B2 * | 8/2021 | Sugita | G05D 7/0647 |
| 11,526,181 | B2 * | 12/2022 | Lull | G01F 1/00 |
| 2002/0174898 | A1 * | 11/2002 | Lowery | G05D 7/0635 137/487.5 |
| 2003/0098069 | A1 * | 5/2003 | Sund | G01F 1/8422 137/487.5 |
| 2004/0112435 | A1 * | 6/2004 | Olander | G05D 7/0652 137/487.5 |
| 2004/0204794 | A1 * | 10/2004 | Ohmi | G05D 7/0635 700/282 |
| 2005/0189018 | A1 * | 9/2005 | Brodeur | G05D 7/0635 137/487.5 |
| 2006/0236781 | A1 * | 10/2006 | Ohmi | G05D 7/0635 73/861.52 |
| 2006/0278276 | A1 * | 12/2006 | Tanaka | G05D 7/0635 137/487.5 |
| 2010/0269924 | A1 * | 10/2010 | Yasuda | G05D 11/132 137/488 |
| 2011/0120566 | A1 * | 5/2011 | Ohmi | G01F 1/42 137/12 |
| 2013/0186486 | A1 * | 7/2013 | Ding | G05D 7/0635 137/487 |
| 2013/0233085 | A1 * | 9/2013 | Mizoguti | G01L 13/025 73/716 |
| 2013/0269795 | A1 * | 10/2013 | Yasuda | G05D 7/0106 137/488 |
| 2014/0182692 | A1 * | 7/2014 | Hirata | G05D 7/0635 137/486 |
| 2016/0033973 | A1 * | 2/2016 | Takijiri | G05D 7/0635 700/282 |
| 2016/0109886 | A1 * | 4/2016 | Ohmi | G05D 7/0641 137/599.06 |
| 2018/0253111 | A1 * | 9/2018 | Goto | G01F 15/005 |
| 2018/0283914 | A1 * | 10/2018 | Sugita | G01F 1/50 |
| 2019/0243391 | A1 * | 8/2019 | Hirata | H01L 21/67017 |
| 2020/0033895 | A1 * | 1/2020 | Sugita | G01F 1/363 |
| 2020/0033896 | A1 * | 1/2020 | Tseng | G05D 7/0647 |
| 2020/0199753 | A1 * | 6/2020 | Hidaka | B01B 1/06 |
| 2022/0197316 | A1 * | 6/2022 | Hirata | G01L 15/00 |

FOREIGN PATENT DOCUMENTS

| | | | |
|---|---|---|---|
| JP | 2013-185873 A | 9/2013 | |
| WO | 2017/057129 A1 | 4/2017 | |
| WO | WO-2018053538 A1 * | 3/2018 | ............... G01F 1/40 |

* cited by examiner

FLOW RATE CONTROL DEVICE

TECHNICAL FIELD

The present invention relates to a flow rate control device, and more particularly, to a flow rate control device provided in a gas supply line of semiconductor manufacturing equipment, chemical manufacturing equipment, or the like.

BACKGROUND ART

In semiconductor manufacturing equipment and chemical plants, various types of flowmeters and flow rate control devices are utilized for controlling the flow rate of a gas such as a material gas or an etching gas. Among these, a pressure type flow rate control device is widely used because it is possible to control mass flow rates of various fluids with high accuracy by a relatively simple mechanism combining a control valve and a restriction part (e.g., an orifice plate or a critical nozzle). Unlike a thermal type flow rate control device, the pressure type flow rate control device has excellent flow rate control characteristics that stable flow control can be performed even if a primary side supply pressure fluctuates greatly.

In the pressure type flow rate control devices, there is one that adjusts the flow rate by controlling a fluid pressure upstream of the restriction part (hereinafter, sometimes referred to as upstream pressure P1). Further, the upstream pressure P1 is controlled by adjusting an opening degree of the control valve provided upstream of the restriction part.

When a downstream pressure P2 (fluid pressure downstream of the restriction part) with respect to the upstream pressure P1 is sufficiently small, the velocity of the gas passing through the restriction part is fixed to the sound velocity, and the mass flow rate is determined by the upstream pressure P1 regardless of the downstream pressure P2. At this time, it is possible to control the flow rate by feedback control the control valve based on an output of the pressure sensor for measuring the upstream pressure P1. The pressure condition, under which such behavior occurs, is called a critical expansion condition, and the pressure condition is defined as, for example, $P2/P1 \leq \alpha$. In this equation, $\alpha$ is referred to as the critical pressure ratio, and takes a value of approximately 0.45 to 0.6, depending on the gas species.

Further, Patent Document 1 describes a pressure type flow rate control device provided with pressure sensors not only upstream but also downstream of the restriction part. In such a pressure type flow rate control device, even when the downstream pressure P2 is relatively large and the critical expansion condition is not satisfied, it is possible to determine the flow rate by calculation based on both the upstream pressure P1 and the downstream pressure P2. Therefore, the flow rate control can be performed over a wider flow rate range.

In the pressure type flow rate control device described in Patent Document 1, a proportional control referring to the upstream pressure P1 is performed under the critical expansion condition. On the other hand, under the non-critical expansion condition, a differential pressure control referring to the upstream pressure P1 and the downstream pressure P2 is performed.

Specifically, under the critical expansion condition, since the relationship between the flow rate $Q=K1 \cdot P1$ (K1 is a proportional coefficient depending on the type and temperature of the fluid) is established, the proportional control based on the upstream pressure P1 is performed. On the other hand, under the non-critical expansion condition, since the relationship of the flow rate $Q=K2 \cdot P2^m (P1-P2)^n$ is established, where K2 is a proportional coefficient depending on the type and temperature of the fluid, the exponent in and n are values derived from the actual flow rate, the differential pressure control based on the upstream pressure P1 and the downstream pressure P2 is performed. As the actual operation, the arithmetic flow rate Qc is obtained according to the above equation under the critical expansion condition and the non-critical expansion condition, adjustment of the opening degree of the control valve is performed so that the difference between an input set flow rate Qs and the arithmetic flow rate Qc becomes 0.

Switching between the proportional control and the differential pressure control described above is performed according to whether or not P2/P1, which is the ratio of the upstream pressure P1 with respect to the downstream pressure P2, exceeds the threshold value corresponding to the critical pressure ratio $\alpha$. Although the critical pressure ratio differs depending on the gas species, by setting the threshold value to be equal to or lower than the critical pressure ratio of all gas types to be used, it is possible to make the threshold value correspond to all the gas types to be used.

PRIOR ART LITERATURE PATENT DOCUMENTS

Patent Document 1: Japanese Laid-Open Patent Publication No. 2004-138425
Patent Document 2: Japanese Patent No. 4204400

SUMMARY OF INVENTION

Problem to be Solved by Invention

A flow rate control device configured to determine the flow rate based on the upstream pressure P1 and the downstream pressure P2 is also described in Patent Document 2. In the flow rate control device of Patent Document 2, pressure sensors are provided respectively upstream and downstream of the orifice, and the flow rate is obtained from the output of each pressure sensor.

Recently, in such allow control device, the downstream pressure P2 is required to be higher than before to perform flow rate control, in such a condition, the present inventors have found that the flow measurement error becomes relatively large due to the accuracy of each pressure sensor, particularly the zero-point drift of the pressure sensors.

The present invention has been made to solve the above problem, and the main object thereof is to provide a flow rate control device with a wide control flow rate range, in which accuracy reduction due to such zero-point drift of the pressure sensor hardly occurs.

Means for Solving Problem

The flow rate control device according to an embodiment of the present invention includes a control valve, a restriction part provided downstream of the control valve, an upstream pressure sensor for measuring the pressure between the control valve and the restriction part, a differential pressure sensor for measuring the differential pressure between the upstream side and the downstream side of the restriction part, and an arithmetic control circuit connected to the control valve, the upstream pressure sensor, and the differential pressure sensor.

In one embodiment, the arithmetic control circuit performs control of the control valve so that the arithmetic flow rate determined based on the output of the upstream pressure sensor, and the output of the differential sensor of the upstream pressure sensor becomes the set flow rate.

In one embodiment, the control valve control includes differential pressure control in which the operational flow Qc is determined according to $Qc = K2 \cdot (P1-\Delta P)^m \Delta P^n$ or $Qc = C1 \cdot P1/\sqrt{T} \cdot ((P1-\Delta P)/P1)^m - ((P1-\Delta P)/P1)^n)^{1/2}$. In the above equation, P1 is the upstream pressure outputted by the upstream pressure sensor; $\Delta P$ is the differential pressure outputted by the differential pressure sensor; K2 is the proportional coefficient depending on the fluid type and fluid temperature, m and n are constants derived from the actual flow, C1 is the coefficient containing, the orifice cross-sectional area; T is the gas temperature.

In one embodiment, the control of the control valve further includes a proportional control in which the arithmetic flow rate Qc is determined according to $Qc = K1 \cdot P1$, where K1 is a proportionality coefficient dependent on the fluid type the fluid temperature.

In one embodiment, the ratio of the output of the upstream pressure sensor and the arithmetic downstream pressure obtained by subtracting the output of the differential pressure sensor from the output of the upstream pressure sensor, by comparing with a preset threshold, it is determined to perform either the proportional control or the differential pressure control.

In one embodiment, the differential pressure sensor includes: a primary-side connection member connected to a flow path upstream of the restriction part, a secondary-side connection member connected to a flow path downstream of the restriction part, and a sensor body connected to the primary-side connection member and the secondary-side connection member, and incorporated with a sensor chip for measuring differential pressure, wherein the sensor chip includes a pressure-sensing portion having one surface for transmitting the pressure upstream of the restriction part and another surface for transmitting the pressure downstream of the restriction part, and a strain sensor for detecting strain in the pressure-sensing portion.

In one embodiment, the secondary connection member includes a piping member whose connecting position is adjustable.

In one embodiment, the upstream pressure sensor and the differential pressure sensor are integrally formed.

The flow rate control device according to another embodiment of the present invention includes a control valve, a restriction part provided downstream of the control valve, a differential pressure sensor for measuring the differential pressure between the upstream side and the downstream side of the restriction part, a downstream pressure sensor for measuring the pressure downstream of the restriction part, and an arithmetic control circuit connected to the control valve, the differential pressure sensor, and the downstream pressure sensor.

In one embodiment, the arithmetic control circuit controls the control valve so that the arithmetic flow rate determined on the basis of the output of the differential pressure sensor and the output of the downstream pressure sensor becomes the set flow rate.

In one embodiment, the control of the control valve, the arithmetic flow rate includes a differential pressure control determined according to Qc is $Qc = K2 \cdot P2^m \cdot \Delta P^n$ or $Qc = C1 \cdot (\Delta P+P2)/\sqrt{T} \cdot ((\Delta P+P2))^m - (\Delta P2/(\Delta P+P2))^n)^{1/2}$, in the above equations, $\Delta P$ is the differential pressure output by the differential pressure sensor, P2 is the downstream pressure output by the downstream pressure sensor, K2 is the proportional coefficient depending on the type of the fluid and fluid temperature, m and n are constants derived from the actual flow rate, C1 is a coefficient including the orifice cross-sectional area, T is the gas temperature.

In an embodiment, the control of the control valve further comprises a proportional control in which the arithmetic flow rate Qc is determined according to $Qc = K1 \cdot (\Delta P+P2)$, where K1 is a proportionality factor dependent on the type of fluid and the fluid temperature.

In one embodiment, performing either the proportional control or the differential pressure control is determined by comparing the ratio between the arithmetic upstream pressure obtained by adding the output of the downstream pressure sensor to the output of the differential pressure sensor and the output of the downstream pressure sensor, with a threshold value set in advance.

Effect of Invention

According to the embodiment of the present invention, a pressure-type flow rate control device strong to the error of the pressure sensor is provided.

DETAILED DESCRIPTION OF EMBODIMENT

Embodiments of the present invention will be described below with reference to the drawings, but the present invention is not limited to the following embodiments.

Figure 1:
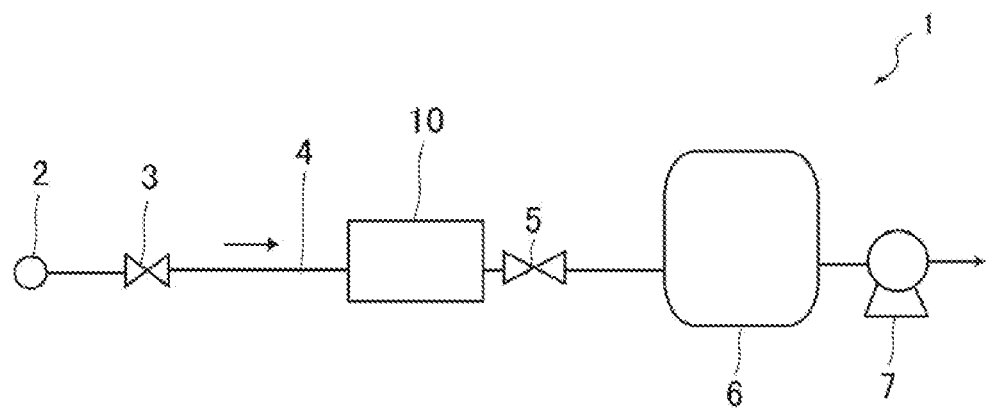
FIG. 1 is a diagram schematically showing a gas supply system incorporating a flow rate control device according to an embodiment of the present invention.

FIG. 1 shows a gas supply system 1 incorporating a pressure-type flow rate control device 10 according to an embodiment of the present invention. The gas supply system 1 includes a gas supply source 2, a flow rate control device 10 provided in the flow path 4 forming a gas supply line, open/close valves (on-off valves) 3 and 5 provided upstream and downstream of the flow rate control device 10, a process chamber 6 connected to the downstream of the on-off valve 5, and a vacuum pump 7 connected to the process chamber 6.

The flow rate control device 10 is provided so as to control the flow rate of the gas flowing through the flow path 4. The vacuum pump 7 can vacuum the process chamber 6 and the flow path 4, the flow rate-controlled gas is supplied to the process chamber 6 while the downstream of the flow rate control device 10 is in a depressurized state. From the gas supply source 2, a variety of gases used in the semiconductor manufacturing process may be supplied, such as raw gas, etching gas, or carrier gas.

Although only one gas supply line is shown in FIG. 1, a plurality of gas supply lines corresponding to each gas may be connected to the process chamber 6. Further, in the present embodiment, although the on-off valves 3 and 5 are provided upstream and downstream of the flow rate control device 10, the on-off valve 5 downstream may be built in the outlet side of the flow rate control device 10. As the on-off valves 3 and 5, a valve having good shut-off property and responsiveness, for example, an air operated valve (AOV), a solenoid valve, or an electric valve is preferably used.

Figure 2:
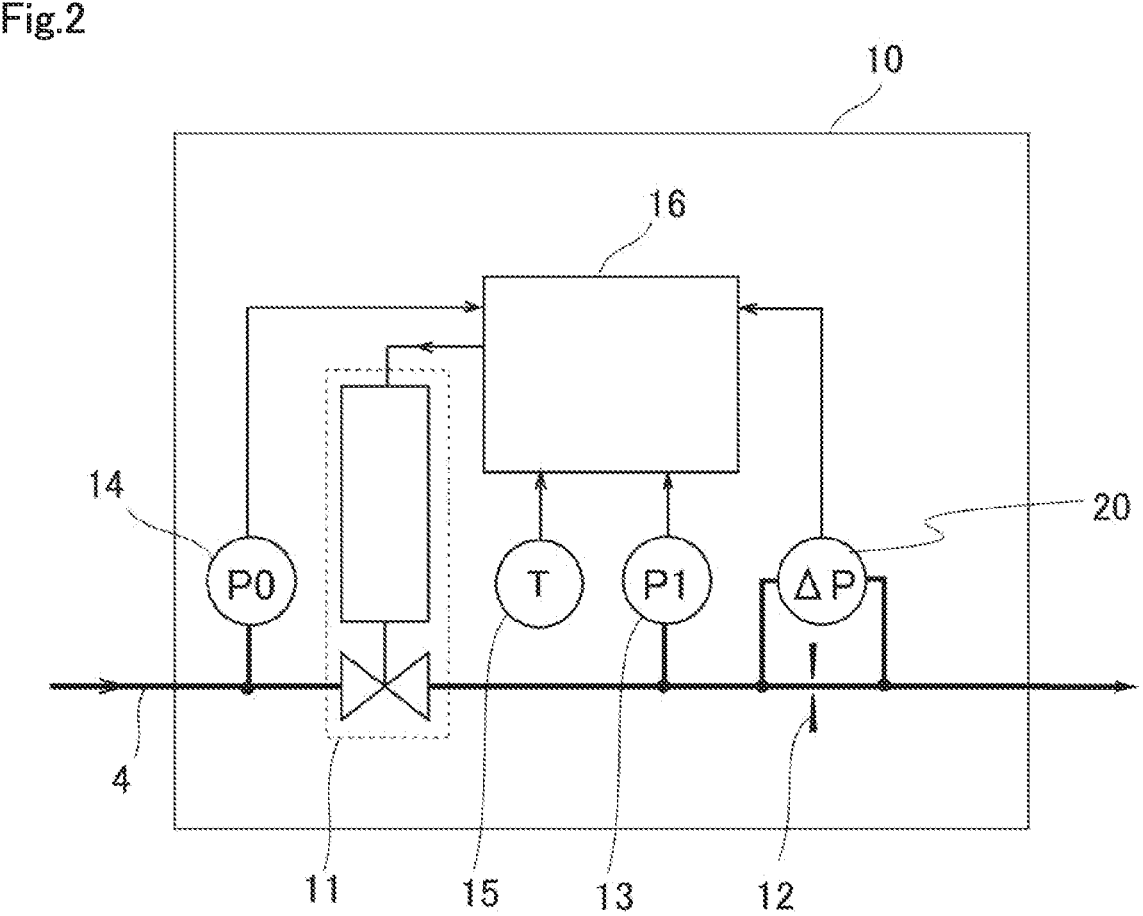
FIG. 2 is a diagram schematically showing a flow rate control device according to an embodiment of the present invention.

FIG. 2 is a schematic diagram showing a configuration of the flow rate control device 10 of the present embodiment. As shown in FIG. 2, the flow rate control device 10 includes a control valve 11 interposed in the flow path 4, a restriction part 12 provided downstream of the control valve 11, an upstream pressure sensor 13 for measuring the pressure (upstream pressure) P1 between the control valve 11 and the restriction part 12, a differential pressure sensor 20 for directly measuring the differential pressure ΔP between the upstream and downstream of the restriction part 12, an inflow pressure sensor 14 for measuring the upstream pressure (supply pressure) P0 of the control valve 11, a temperature sensor 15 for measuring the temperature T of the fluid, and an arithmetic control circuit 16.

To the arithmetic control circuit 16, the upstream pressure sensor 13, the differential pressure sensor 20, the inflow pressure sensor 14, and the temperature sensor 15, etc. are connected, the arithmetic control circuit 16 can receive the output from each sensor. Further, the arithmetic control circuit 16 is connected to the driving element of the control valve 11, and it is possible to adjust the opening degree of the control valve 11 based on the output of each sensor to control the flow rate of the gas flowing downstream of the restriction part 12.

Figure 3:
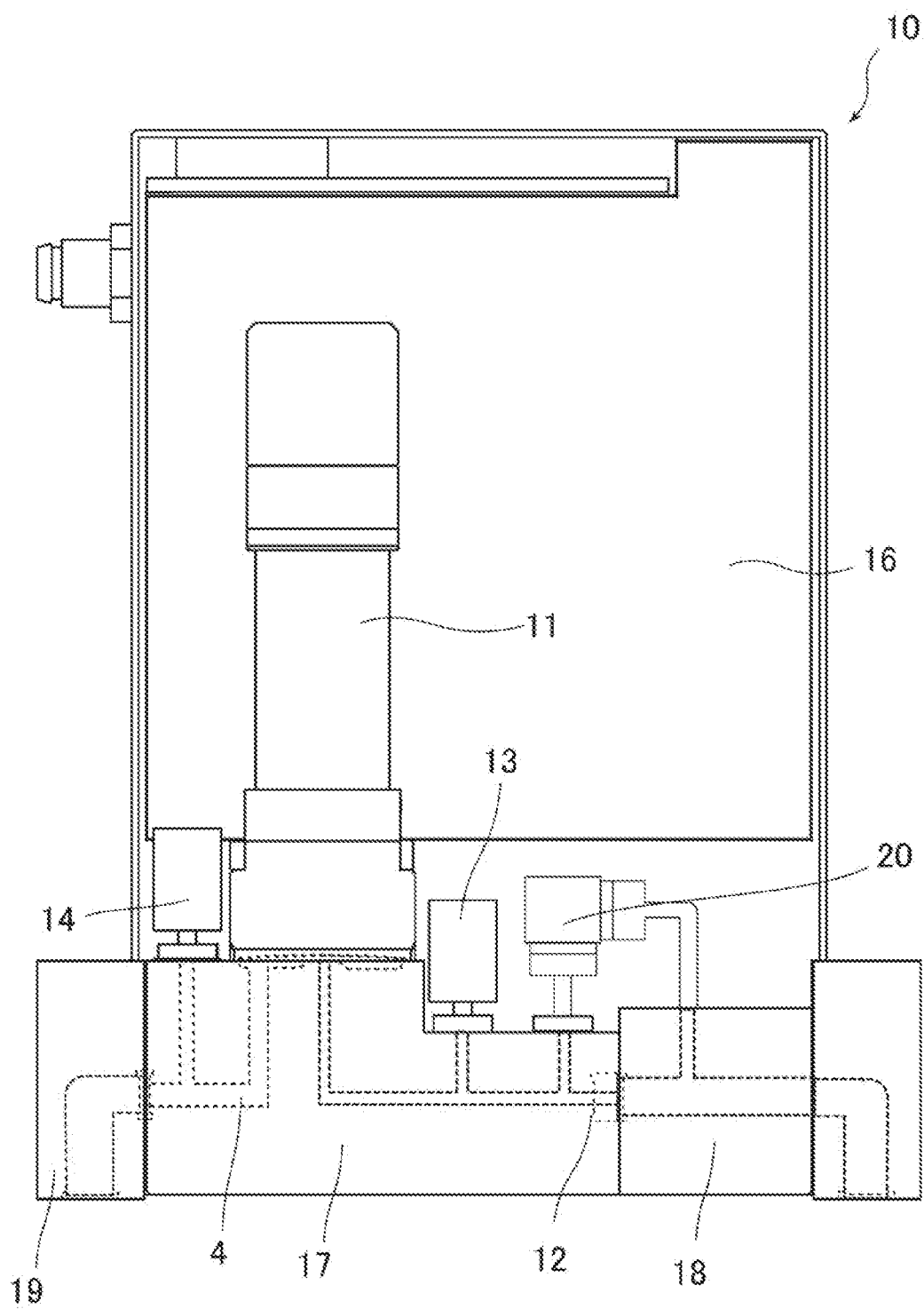
FIG. 3 is a side view showing a more specific configuration of a flow rate control device according to an embodiment of the present invention.

FIG. 3 shows a side view of a specific configuration of the flow rate control device 10 of the present embodiment, and the internal flow path (broken line).

As shown in FIG. 3, the flow path 4 is formed by providing holes in the main body block 17 and an outlet block 18. The main body block 17 and the outlet block 18 are preferably made of a material that is not reactive with the gases used, for example, stainless steel, such as SUS316L. In addition, in FIG. 3, although the temperature sensor 15 shown in FIG. 2 is not shown, a temperature sensor may be configured by providing a bottomed hole in the vicinity of the flow path 4 and placing a thermistor or the like therein.

On the upper surface of the main body block 17, the inflow pressure sensor 14, the control valve 11, the upstream pressure sensor 13, and the primary port of the differential pressure sensor 20 are attached, these are communicated with the flow path 4 upstream of the restriction part 12. Further, a secondary port of the differential pressure sensor 20 is connected to the upper surface of the outlet block 18 and communicated with the flow path 4 downstream of the restriction part 12.

At the boundary between the main body block 17 and the outlet block 18, an orifice member, more specifically, a gasket-type orifice member having a build-in orifice plate, is provided as the restriction part 12. However, the restriction part 12 is not limited to an orifice plate and may be configured by using a sonic nozzle or the like. The aperture diameter of the orifice or the nozzle is set to, for example, 10 μm to 500 μm.

The upstream pressure sensor 13 can measure the pressure of the flow path between the control valve 11 and the restriction part 12 (upstream pressure P1) and is used for proportional flow control based on the upstream pressure P1. Further, the inflow pressure sensor 14 can measure the pressure (supply pressure P0) of the gas supplied from the gas supply source 2 (for example, a raw material vaporizer), and is used for adjusting the gas supply amount or the supply pressure. The upstream pressure sensor 13 and the inflow pressure sensor 14 may include, for example, a silicon single crystal sensor chip and a diaphragm.

Moreover, the differential pressure sensor 20 is configured to directly measure the differential pressure ΔP of the pressure between the control valve 11 and the restriction part 12 in respect to the downstream pressure of the restriction part 12, and is used for performing differential pressure flow rate control. The differential pressure sensor 20 may also include a silicon single crystal sensor chip and a diaphragm. The detailed configuration of the differential pressure sensor 20 will be described later.

The control valve 11 may be a piezoelectric element driven valve constituted by, for example, a metal diaphragm as the valve element, and a piezoelectric element (piezo actuator) as a driving device for driving the valve element. The piezo element driven valve can change the opening in accordance with the driving voltage to the piezo element and adjusting the opening arbitrarily by controlling the drive voltage.

In the present embodiment, the inlet block 19 having an inlet is fixed to the upstream side of the main body block 17 via a gasket, the outlet block 18 having an outlet is fixed to the downstream side of the main body block 17, via a gasket type orifice member (restriction part 12). The inlet block 19 and outlet block 18 may be also formed of, for example, stainless steel (SUS316L, etc.).

The flow path provided in the inlet block 19 and the outlet block 18 is formed relatively thick, whereas the flow path between the control valve 11 and the restriction part 12, in particular, of the main body block 17, is formed as narrow as possible. Further, the flow path downstream of the control valve 11 extends so as to hang from the central portion of the valve element of the control valve 11.

According to such a configuration, when the control valve 11 is closed, the internal volume between the control valve 11 and the restriction part 12 can be made as small as possible. Thus, the amount of gas flowing out through the restriction part 12 after closing the control valve 11 is reduced, the falling response may be improved. The diameter of the flow path downstream of the control valve 11 is typically designed to be smaller than the diameter of the flow path upstream of the control valve 11.

The arithmetic control circuit 16 can be realized by a combination of hardware and software, for example, it may be configured of a processor, or a memory provided on a circuit board, and includes a computer program for executing a predetermined arithmetic operation based on an input signal. The arithmetic control circuit 16 in the illustrated embodiment is incorporated in the flow rate control device 10, a part or all its components (such as CPU) may be provided outside of the flow rate control device 10.

Figure 4:
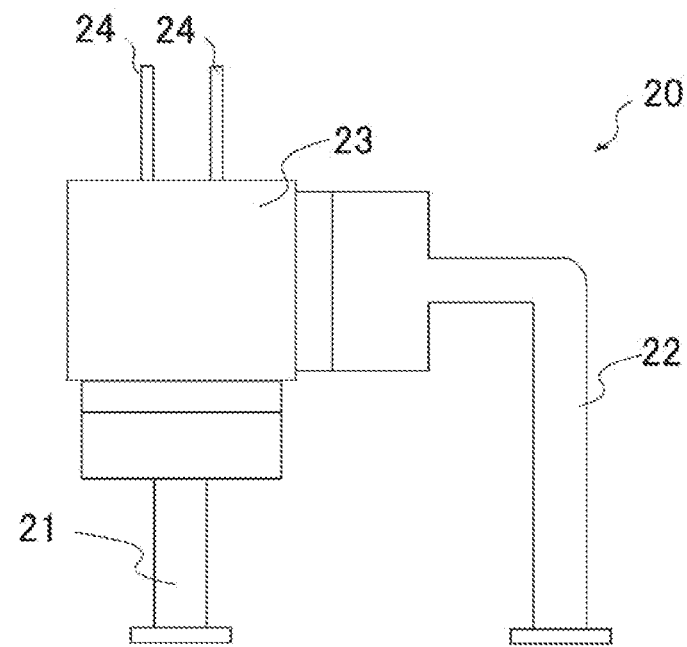
FIG. 4 is a side view showing a differential pressure sensor provided in the flow rate control device according to an embodiment of the present invention.

Hereinafter, with reference to FIGS. 4 and 5, the configuration of the differential pressure sensor 20 of the flow rate control device 10 will be described.

The differential pressure sensor 20 is configured of a primary-side connection member 21 connected to the upstream side of the restriction part 12, a secondary-side connection member 22 connected to the downstream side of the restriction part 12, and a sensor body 23 connected to the primary-side connection member 21 and the secondary-side connection member 22. In the differential pressure sensor 20, the primary-side connection member 21 is fixed to the lower surface of the sensor body 23, the secondary-side connection member 22 is fixed to the side surface of the sensor body 23.

The differential pressure sensor 20, as shown in FIG. 3, is attached to the main body block 17 and the outlet block 18, so as to straddle the restriction part 12. In this case, since it is necessary to fix the primary side port and the secondary side port at two positions, a positional deviation is likely to occur. Therefore, the secondary-side connection member 22, to some extent, is preferably designed so as to easily adjust the connected position. In the present embodiment, it is configured using a thin metal fine tube bent into an L-shape as a deformable pipe member. Thus, even when the positional deviation occurs when fixing the differential pressure sensor 20, it is possible to appropriately perform the fixing by deforming the secondary-side connection member 22. As the secondary side connection member 22, a more flexible tube material may be used.

In the differential pressure sensor 20, the upstream pressure P1 is transmitted to the sensor chip incorporated in the sensor body 23 via the primary-side connection member 21 and the downstream pressure P2 is transmitted to the same sensor chip via the secondary-side connection member 22. The transmission of the pressure can be performed by using, for example, a sealing liquid for pressure transmission.

Figure 5:
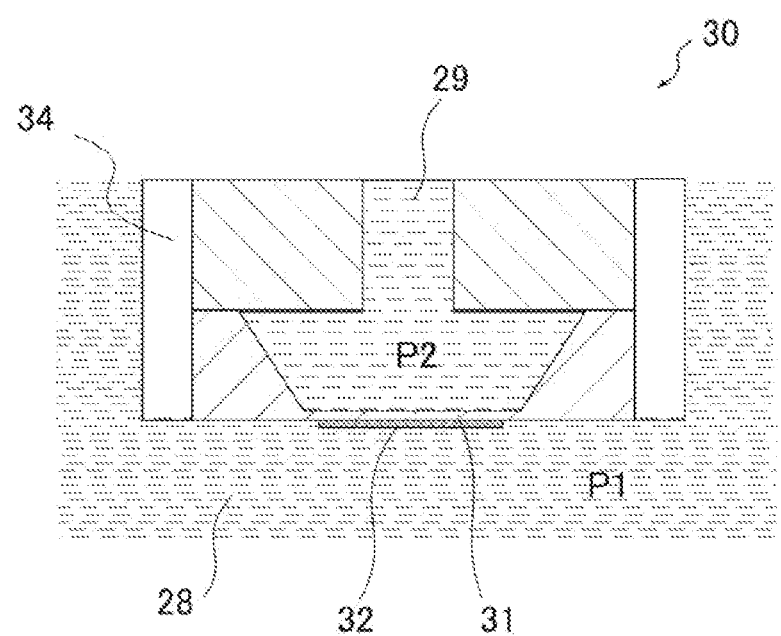
FIG. 5 is a cross-sectional view showing a sensor chip provided in a differential pressure sensor according to an embodiment of the present invention.

FIG. 5 is a cross-sectional view showing a sensor chip 30 incorporated in the sensor body 23. The sensor chip 30 has a thin-plate-shaped pressure-sensing portion (diaphragm) 31. The Pressure-sensing portion 31 is formed by, for example, cutting a silicon single crystal.

In the sensor chip 30, one surface of the pressure-sensing portion 31 (here the lower surface) is in contact with a first sealing liquid 28 and the other surface (here the upper surface) is in contact with a second sealing liquid 29. The first sealing liquid 28 transmits the upstream pressure P1, and the second sealing liquid 29 transmits the downstream pressure P2. In this configuration, the upstream pressure P1 is transmitted to one surface of the pressure-sensing section 31, the downstream pressure P2 is transmitted to the other surface of the pressure-sensing section 31. In addition, the sensor chip 30 is fixed to the sensor body 23 by the support member 34 surrounding the periphery.

Further, a strain sensor (or piezo resistor) 32 is provided in the pressure-sensing portion 31 of the sensor chip 30. As long as the stress and strain generated in the pressure-sensing portion 31 can be detected, the strain sensor 32 may be constructed by a single unit or by a plurality of units.

Also, the mounting position is not limited to the illustrated embodiment. The output of the strain sensor 32 provided in the pressure-sensing portion 31 (change in electrical resistance value) is transmitted to the arithmetic control circuit 16 via wirings 24 connected to the strain sensor 32 (refer to FIG. 4).

In the differential pressure sensor 20 having the above configuration, the upstream pressure P1 is transmitted to one surface of the pressure-sensing portion 31 of the sensor chip 30 through the first sealing liquid 28. Further, the downstream pressure P2 is transmitted to the other surface of the pressure-sensing portion 31 of the sensor chip 30 through the second sealing liquid 29. Then, in the pressure-sensing portion 31, the surface stress corresponding to the magnitude of the differential pressure between the upstream pressure P1 and the downstream pressure P2 is generated, and a distortion occurs corresponding to the magnitude of the differential pressure.

The magnitude of the distortion of the pressure-sensing portion 31 is detected through the wirings 24 as an electrical resistance value change of the strain sensor 32. In this manner, the differential pressure sensor 20 determines the differential pressure $\Delta P$ between the upstream pressure P1 and the downstream pressure P2 by direct measurement using the strain sensor 32, but not an indirect calculation of subtraction from the absolute value of each pressure. In addition, the strain sensor 32 is usually incorporated in the bridge circuit, the distortion amount of the strain sensor 32 (resistance value change) is output as a bridge output signal, so it is possible to determine the differential pressure $\Delta P$ from the bridge output signal.

Referring again to FIG. 3, in the flow rate control device 10 of the present embodiment, it is possible to measure the upstream pressure P1 using the upstream pressure sensor 13, and at the same time to measure the differential pressure $\Delta P$ on both sides of the restriction part 12 using the differential pressure sensor 20. Then, the flow rate control device 10 determines whether or not the critical expansion condition is satisfied, on the basis of the upstream pressure P1 and the differential pressure $\Delta P$. More specifically, whether it is under a critical expansion condition or a non-critical expansion condition is determined by whether or not the (P1−$\Delta P$)/P1 exceeds a threshold value (e.g., 0.45) corresponding to the critical pressure ratio. As the threshold value, a value corresponding to all gas species may be used, or a value set for each gas species may be used.

The above (P1−$\Delta P$) is the pressure corresponding to the downstream pressure P2. However, it is not measured using the downstream pressure sensor, but is obtained by calculation from the measurement result of the upstream pressure sensor 13 and the differential pressure sensor 20. Therefore, in this specification, in order to distinguish it, the arithmetic pressure P1−$\Delta P$ may be referred to as the arithmetic downstream pressure P2'.

The determination as to whether or not it is under the critical expansion condition is not limited to the determination based on whether or not P2'/P1 exceeds the threshold values as described above. For example, if P1/P2' exceeds a threshold, e.g., 2.2, it may be determined that it is under the critical expansion condition. In a preferable embodiment, the determination is made by comparing the ratio of the upstream pressure P1 output by the upstream pressure sensor and the arithmetic downstream pressure P2' obtained by subtracting the differential pressure $\Delta P$ output by the differential pressure sensor from the upstream pressure P1 with a corresponding threshold value set in advance. However, other suitable determinative equations may be used, as long as the upstream pressure P1 and the differential pressure ΔP are used. Further, it is needless to say that the determination may be made on the basis of whether or not it is equal or greater than the threshold value, but not on whether or not it exceeds the threshold value as described above.

When it is determined as under the critical expansion condition, the flow rate control device 10 performs a flow rate control by a proportional control based on the upstream pressure P1. On the other hand, when it is determined as under a non-critical expansion condition, the flow rate control device 10 performs a flow rate control by a differential pressure control based on the upstream pressure P1 and the arithmetic downstream pressure P2'(=P1−ΔP) or differential pressure ΔP.

More specifically, under the critical expansion condition, since the relationship between the flow rate Qc=K1·P1 (where K1 is a proportional coefficient depending on the fluid species and the fluid temperature) is established, the proportional control based on the upstream pressure P1 is performed. On the other hand, under the non-critical expansion condition, since the relationship between the flow rate Qc=K2·P2'$^m$(P1−P2')$^n$=K2·P2'$^m$(ΔP)$^n$=K2·(P1−ΔP)$^m$ΔP$^n$ (where K2 is a proportional coefficient depending on the fluid species and the fluid temperature, the exponent m and n are constants derived from the actual flow rate) is established, the differential pressure control based on the upstream pressure P1 and the arithmetic downstream pressure P2' or the differential pressure ΔP is performed. The arithmetic control circuit 16 calculates the difference between the flow rate Qc obtained by the above equation and the input set flow rate Qs, then feedback controls the opening degree of the control valve 11 to make the difference approaches 0. Thus, it is possible to flow the gas at a set flow rate Qs downstream the restriction part 12.

As the proportional control and the differential pressure control, various known methods may be employed. For example, as same as the method described in Patent Document 2, when performing the differential pressure control, the arithmetic flow rate Qc may be obtained according to the following equation:

$$Qc=C1·P1/\sqrt{T}·((P2'/P1)^m-(P2'/P1)^n)^{1/2}=C1·P1/\sqrt{T}·(((P1-\Delta P)/P1)^m-((P1-\Delta P)/P1)^n)^{1/2}.$$

In the above equation, C1 is the coefficient including the orifice cross-sectional area, P1 is the upstream pressure (Pa), T is the gas temperature (K), P2' is the arithmetic downstream pressure (Pa), m and n are constants derived from the actual flow rate.

Further, as same as the method described in Patent Document 2, when performing the differential pressure control, the arithmetic flow rate may be corrected by using a correction data storage circuit that stores the relationship between the arithmetic downstream pressure P2' and the flow rate error. The flow rate control device 10 of the present embodiment may adopt various known flow rate control methods described in Patent Document 2 and the like, except for using the arithmetic downstream pressure P2' instead of the downstream pressure P2 measured by the downstream pressure sensor. Similarly, the flow rate control device 10 of the present embodiment may adopt various known flow rate control methods described in Patent Document 2 and the like, except for using the differential pressure ΔP measured directly by a differential pressure sensor, instead of using the P1−P2 obtained by calculation from the measured values of the upstream pressure sensor and the downstream pressure sensor.

Hereinafter, in the flow rate control device of the present embodiment, the reason for using the arithmetic downstream pressure P2' by the upstream pressure sensor and the differential pressure sensor, rather than using the downstream pressure P2 by the downstream pressure sensor, which is an absolute pressure sensor, will be described.

Figure 6:
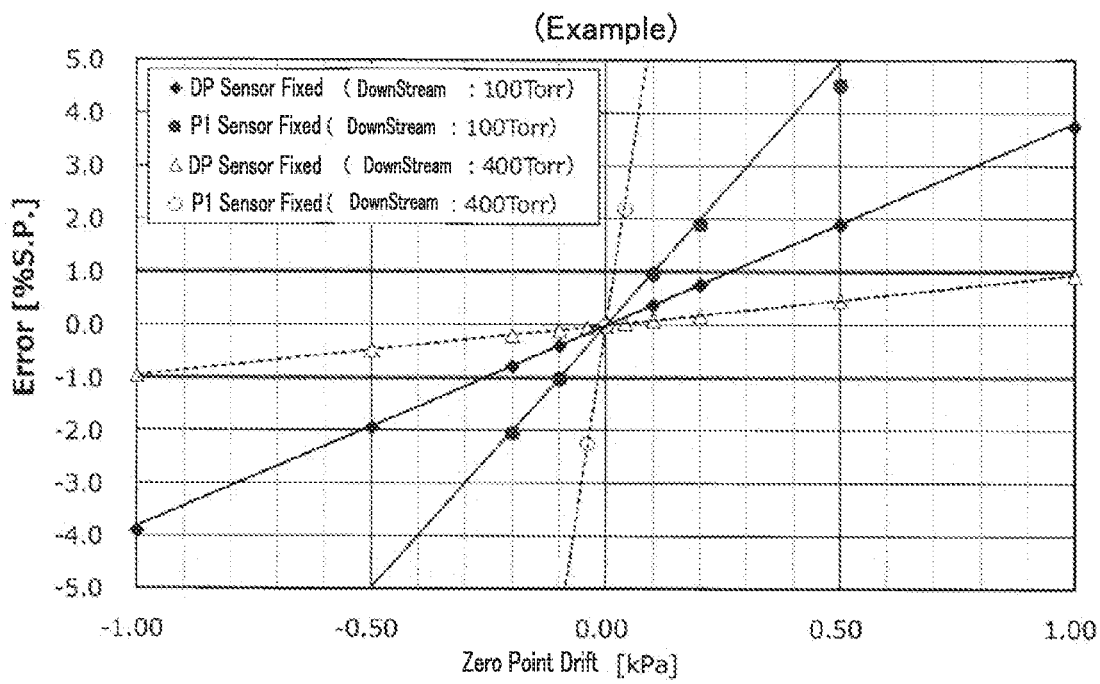
FIG. 6 is a graph showing the relationship between the zero-point drift of the pressure sensor and the flow rate error in an exemplary embodiment.
Figure 7:
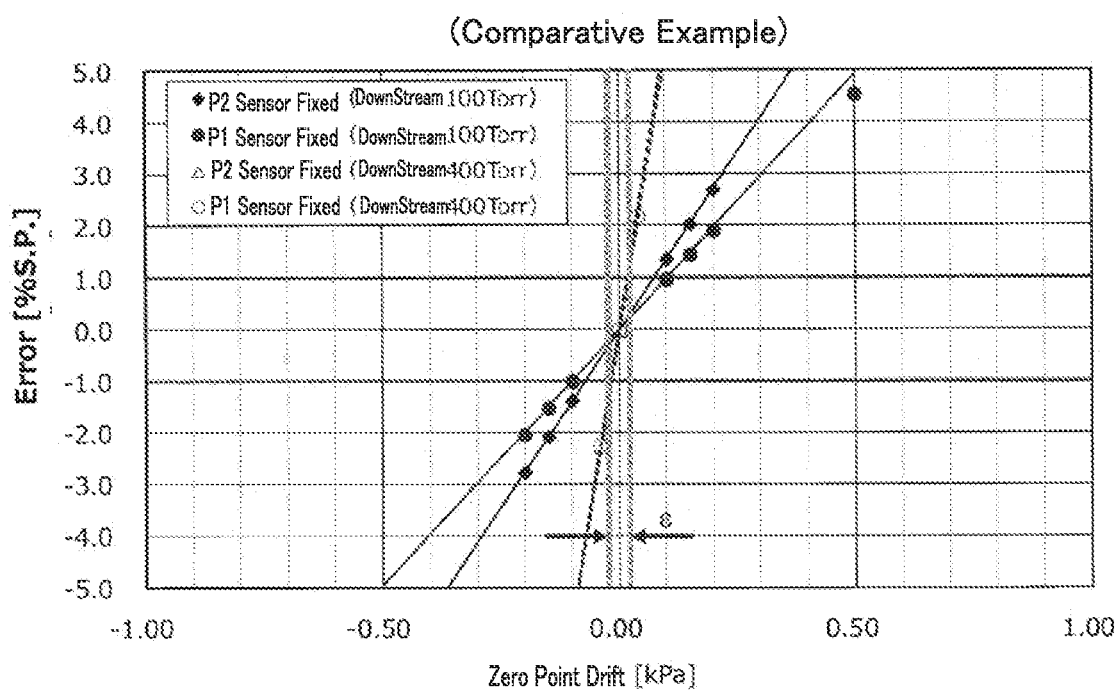
FIG. 7 is a graph showing the relationship between the zero-point drift of the pressure sensor and the flow rate error in a comparative embodiment.

FIG. 6 and FIG. 7 are graphs (simulation results) showing the relationship between the zero-point drifts of the pressure sensor and the differential pressure sensor (kPa) and the flow rate error (% S.P.) in an embodiment and a comparative example respectively. The embodiment of FIG. 6 corresponds to the case of using the flow rate control device having a differential pressure sensor shown in FIG. 3. The comparative example of FIG. 7 corresponds to the case of using the conventional flow rate control device having the upstream pressure sensor and the downstream pressure sensor as described in Patent Document 1. In addition, the zero-point drift amount, which occurs in any pressure, means a difference (drift amount) between the true pressure and the measured pressure, it is intended to correspond to the error that cannot be completely calibrated in the pressure sensor, the deviation of the measured pressure generated with long-term use of the pressure sensor, or the measured pressure deviation due to temperature (temperature drift), etc.

FIG. 6 shows how the magnitude of the deviation of the pressure due to errors affects the flow rate, in the case where zero-point drift occurs in either the upstream pressure sensor (P1 sensor) or the differential pressure sensor, and the measured pressure is different from the true pressure value. Similarly, FIG. 7 shows how the magnitude of the deviation of the pressure due to errors affects the flow rate in the case where a zero-point drift occurs in either the upstream pressure sensor (P1 sensor) and the downstream pressure sensor (P2 sensor), and the measured pressure is different from the true pressure value. Note that the flow rate error indicates the flow rate error that occurs when performing the differential pressure control.

In FIG. 6, the "DP sensor fixed" means that the zero-point drift occurs in the P1 sensor while the zero-point drift does not occur in the differential pressure sensor, and the "P1 sensor fixed" means that the zero-point drift occurs in the differential pressure sensor while the zero-point drift does not occur in the P1 sensor. Similarly, in FIG. 7, the "P2 sensor fixed" means that the zero-point drift occurs in the P1 sensor while the zero-point drift does not occur in the P2 sensor, the "P1 sensor fixed" means that zero-point drift occurs in the P2 sensor while the zero-point drift does not occur in the P1 sensor.

Further, in FIGS. 6 and 7, two types of graphs of the case where the downstream pressure P2 is 100 Torr and the case of 400 Torr are shown. In the flow rate control device configured to flow the gas at 100% flow rate when the upstream pressure P1 is 2280 Torr (maximum control flow), when the downstream pressure P2 is 100 Torr, if the upstream pressure P1 is 222 Torr or less (corresponding to the 9.7% flow rate), the differential pressure control is performed. Further, in the same device, when the downstream pressure P2 is 400 Torr, the differential pressure control is performed at 39.0% or less. FIGS. 6 and 7 show the relationship when performing the differential pressure control so as to flow the gas at 4% flow rate.

In the embodiment shown in FIG. 6, In the case where the zero-point drift occurs in the P1 sensor (differential pressure sensor is fixed), the drift amount is relatively large, for example, even if the zero-point drift of ±0.2 kPa occurs, the flow rate error falls within ±1% S.P. The same can also be said in the case where the downstream pressure P2 is 100 Torr and 400 Torr, the larger the downstream pressure P2, the smaller the degree of the error that the zero-point drift of the P1 sensor gives to the flow rate accuracy. Note that when the flow rate error is within ±1% S.P., it can be generally considered that the flow rate control is performed with high accuracy. Hereinafter, the zero-point drift amount, in which the flow rate error falls within ±1% S.P., is sometimes referred to as an allowable drift amount.

Further, in the embodiment shown in FIG. 6, in the case where zero-point drift occurs in the differential pressure sensor (P1 sensor is fixed), when the downstream pressure P2 is relatively small as 100 Torr, the allowable drift amount is about ±0.1 kPa, and when the downstream pressure P2 is relatively large as 400 Torr, the allowable drift amount is about ±0.02 kPa, which is a very narrow range.

On the other hand, in the comparative example shown in FIG. 7, even if the zero-point drift occurs in the P1 sensor (P2 sensor is fixed), and if the zero-point drift occurs in the P2 sensor (P1 sensor is fixed), the allowable drift amount is relatively narrow. In particular, when the downstream pressure P2 is relatively large as 400 Torr, even when the zero-point drift occurs in any of the P1 sensor and P2 sensor, the allowable drift amount ε is ±0.02 kPa, has a very narrow range.

From the above, in the case where the zero-point drift occurs at least in the upstream pressure sensor (P1 sensor), the allowable drift amount is large and strong against zero-point drift in the flow control device of the embodiment, as compared with the flow rate control device of the comparative example. Then, in the embodiment, the larger the downstream pressure P2, the less the reflection of the zero-point drift of the upstream pressure sensor on the flow rate error. Therefore, it is understood that the embodiment has more advantageous when the downstream pressure P2 is large, and the flow rate control of the small flow rate is performed.

Furthermore, in the flow control device of the present embodiment using a differential pressure sensor, there is an advantage that the zero-point drift of the differential pressure sensor relatively hardly occurs. The reason is that the zero-point calibration of the differential pressure sensor can be performed properly regardless of the magnitudes of the upstream pressure P1 and the downstream pressure P2, if they are the same, even when the flow rate control device is mounted in a line, calibration is possible by closing the valves provided in the front and rear. In contrast, the zero point calibration of the upstream pressure sensor and the downstream pressure sensor is necessary to be performed ideally in a state being connected to a vacuum space, in which the pressure is completely zero, but it is not easy to realize such a vacuum space, also, since the sensor for measuring the degree of vacuum as a reference is required, it is impossible to perform substantially calibration in a state being mounted in the line. Therefore, compared with the differential pressure sensor, the zero-point drift of both the upstream pressure sensor and the downstream pressure sensor tends to become large.

Therefore, according to the flow rate control device 10 of the present embodiment, the zero-point drift of the differential pressure sensor is relatively small, in addition, even if the zero-point drift of the upstream pressure sensor occurs, it is possible to perform the flow rate control with relatively high accuracy. In particular, even when performing the control of a small flow rate at a high downstream pressure P2, since the zero-point drift of the upstream pressure sensor is hardly reflected in the flow rate error, it is possible to appropriately perform the flow rate control over a wide control range.

Hereinafter, a flow rate control device 10A according to another embodiment will be described with reference to FIGS. 8 and 9. Note that, for elements having the same configuration as the flow rate control device 10 of the embodiments shown in FIGS. 3 to 5, the same reference numerals are denoted, and description may be omitted.

Figure 8:
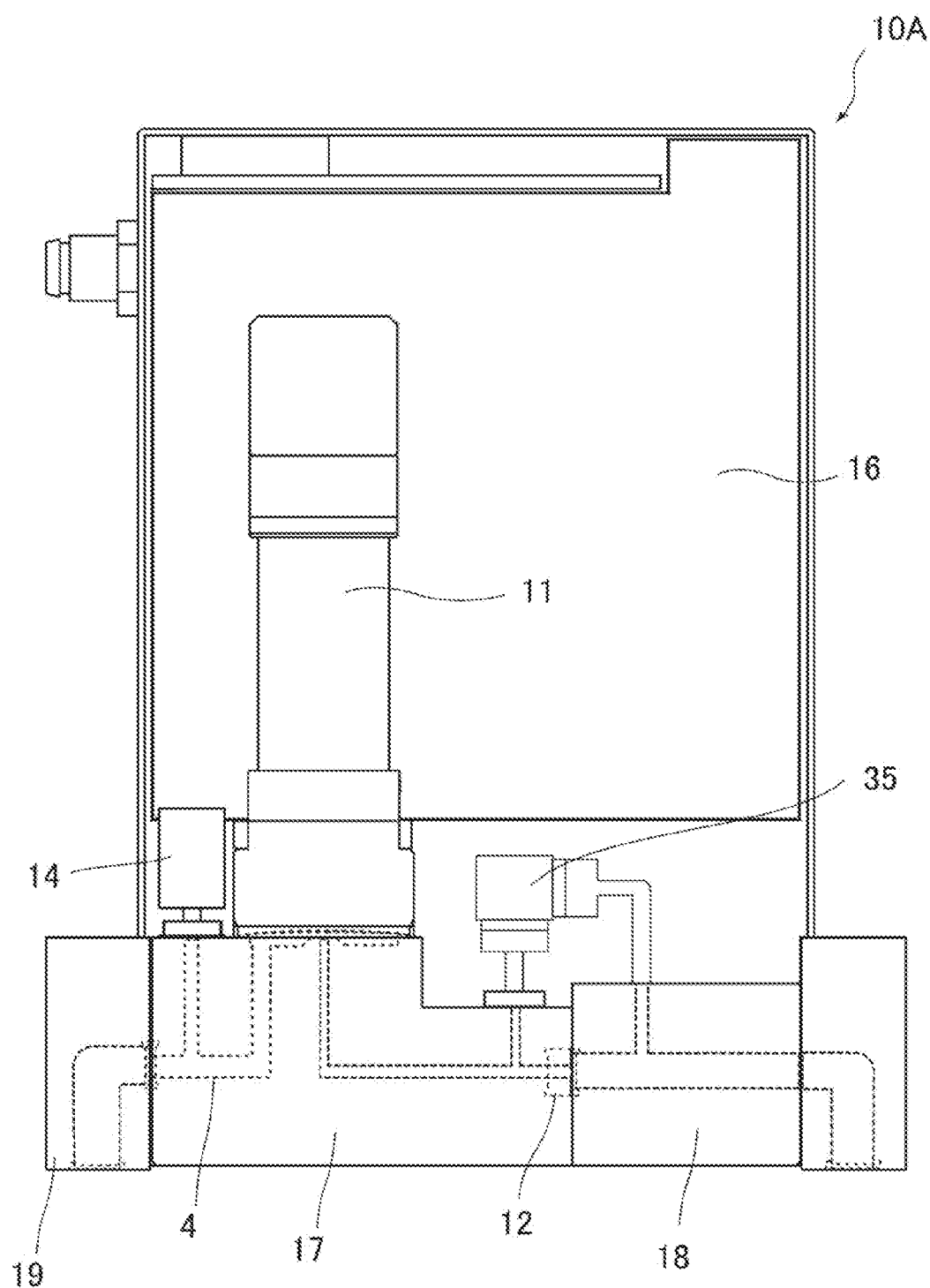
FIG. 8 is a side view showing a configuration of a flow rate control device according to another embodiment of the present invention.

FIG. 8 is a diagram showing a side view of a specific configuration of the flow rate control device 10A, and the inside of the flow path (broken line). In the flow rate control device 10A, different from the flow rate control device 10 shown in FIG. 3, instead of the upstream pressure sensor and the differential pressure sensor provided separately, an integrated sensor 35 of the upstream pressure sensor and the differential pressure sensor is provided.

The primary port of the integrated sensor 35 is connected to the upstream side of the restriction part 12 (main body block 17), the secondary side port of the integrated sensor 35 is connected to the downstream side of the restriction part 12 (outlet block 18). It is also possible to mount the integrated sensor 35 by using a mounting portion for the upstream pressure sensor, and a mounting portion for the downstream pressure sensor provided in the main body block of the conventional flow rate control device.

Figure 9:
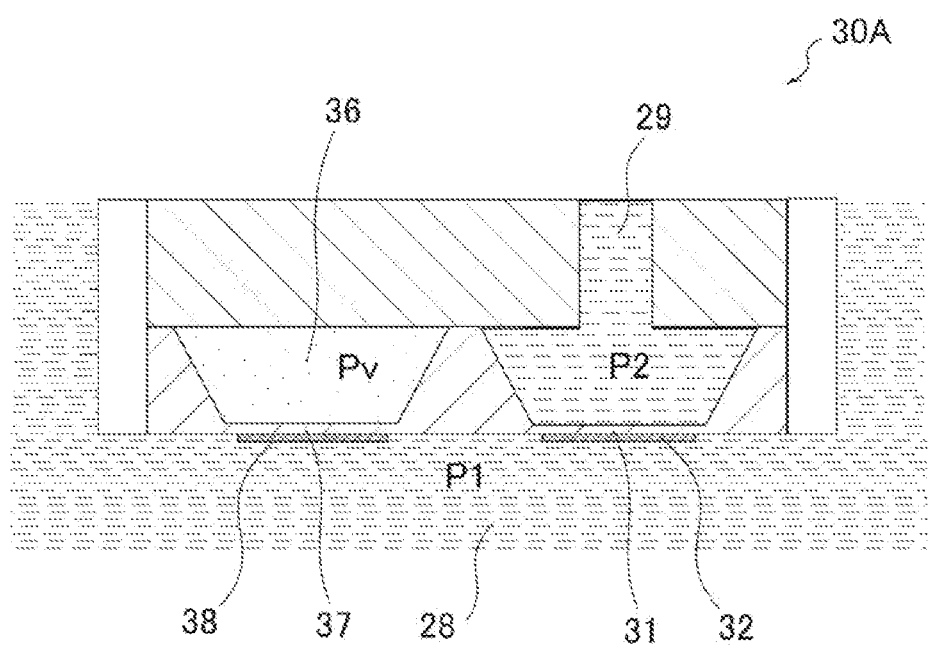
FIG. 9 is a cross-sectional view showing a sensor chip provided in a differential pressure sensor according to another embodiment of the present invention.

FIG. 9 is a cross-sectional view illustrating a configuration of a sensor chip 30A provided in the integrated sensor 35. In the sensor chip 30A, the first sealing liquid 28 is in contact with both the pressure-sensitive portion 31 for measuring the differential pressure ΔP, and the second pressure-sensing portion 37 for measuring the upstream pressure P1.

Similar to the sensor chip 30 shown in FIG. 5, the second sealing liquid 29 is in contact with the opposite surface of the pressure-sensing portion 31, it is possible to measure the differential pressure ΔP between the upstream pressure P1 and the downstream pressure P2 using the strain sensor 32. On the other hand, the opposing surface of the second pressure-sensing portion 37 is in contact with a vacuum chamber 36, the inside of which is maintained at a vacuum pressure Pv. In this configuration, the strain sensor 38 attached to the second pressure-sensing portion 37 is capable of detecting the stress generated. In the second pressure-sensing portion 37, i.e., a stress corresponding to the magnitude of the upstream pressure P1.

In the integrated sensor 35 provided with the sensor chip 30A described above, it is possible to measure both the upstream pressure P1 and the differential pressure ΔP independently. Therefore, it is not necessary to provide the upstream pressure sensor and the differential pressure sensor separately, so as to contribute to the compactness of the device, and to obtain further convenience.

Figure 10:
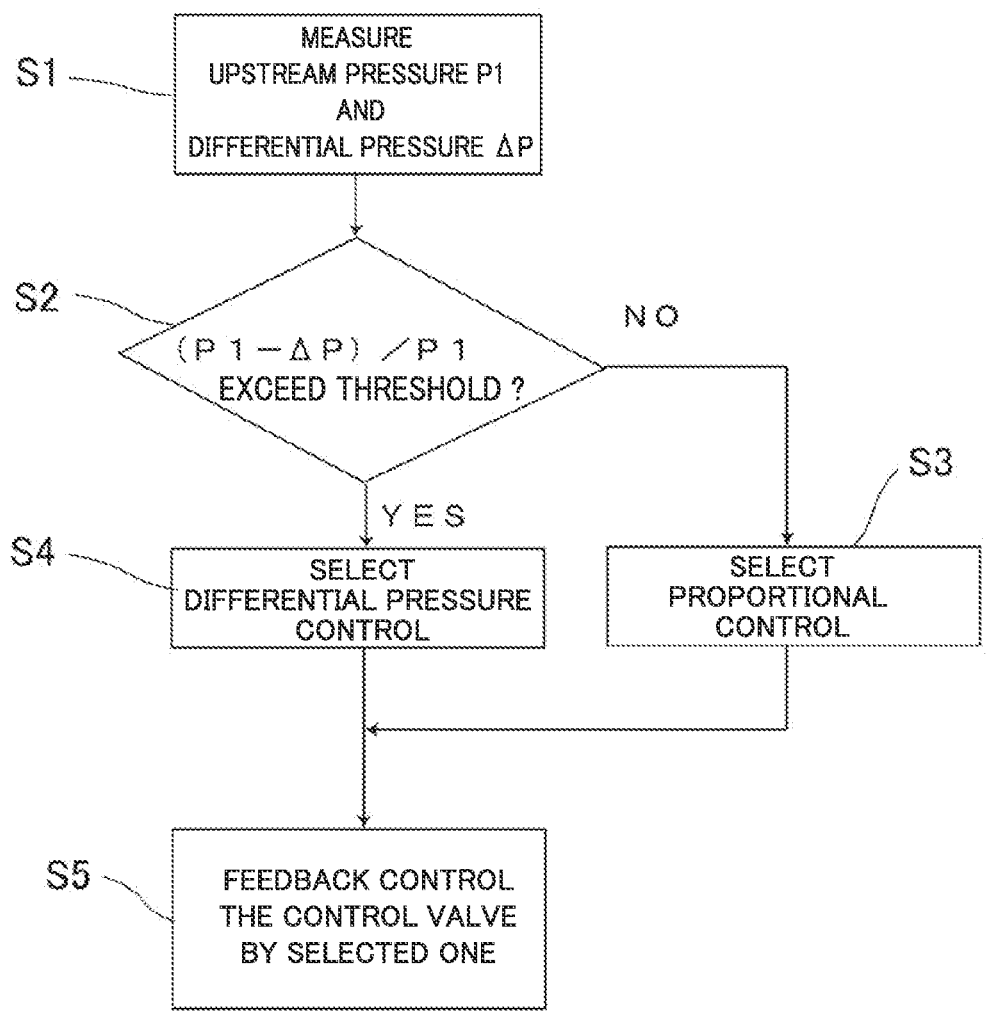
FIG. 10 is an exemplary flow chart of a flow rate control performed using a flow rate control device according to another embodiment of the present invention.

An exemplary flow chart of a flow rate control method using the flow rate control device according to the embodiments of the present invention will be described below with reference to FIG. 10.

First, in step S1, Using the upstream pressure sensor and the differential pressure sensor (or integral sensor) to measure the upstream pressure P1 and the differential pressure ΔP.

Next, in step S2, to determine whether or not it is under the critical expansion condition. More specifically, it is to determine whether or not (P1−ΔP)/P1 obtained by the measurement in step S1 exceeds a threshold value.

In step S2, if it does not exceed the threshold, to determine that it is under the critical expansion condition, then in step S3, to select the proportional control scheme based on the upstream pressure P1. On the other hand, in step S2, if it exceeds the threshold, then in step S4, to select the differential pressure control scheme based on the upstream pressure P1 and the differential pressure ΔP.

Thereafter, in step S5, according to any selected control scheme, it is possible to feedback control the control valve, and flow the gas at a set flow rate.

As described above, by using the upstream pressure sensor and the differential pressure sensor, it is possible to appropriately determine whether or not it is under the critical expansion condition, and it is possible to select an appropriate control from the proportional control and the differential pressure control. Then according to the selected control scheme, in a state where the influence of the sensor error is reduced, it is possible to appropriately perform the flow rate control over a wide flow range.

Hereinafter, the flow rate control device 10B of another embodiment using the downstream pressure sensor and the differential pressure sensor will be described. The same components as the flow rate control device 10 of the above-described embodiment are denoted with the same reference numerals, and detailed description may be omitted.

Figure 11:
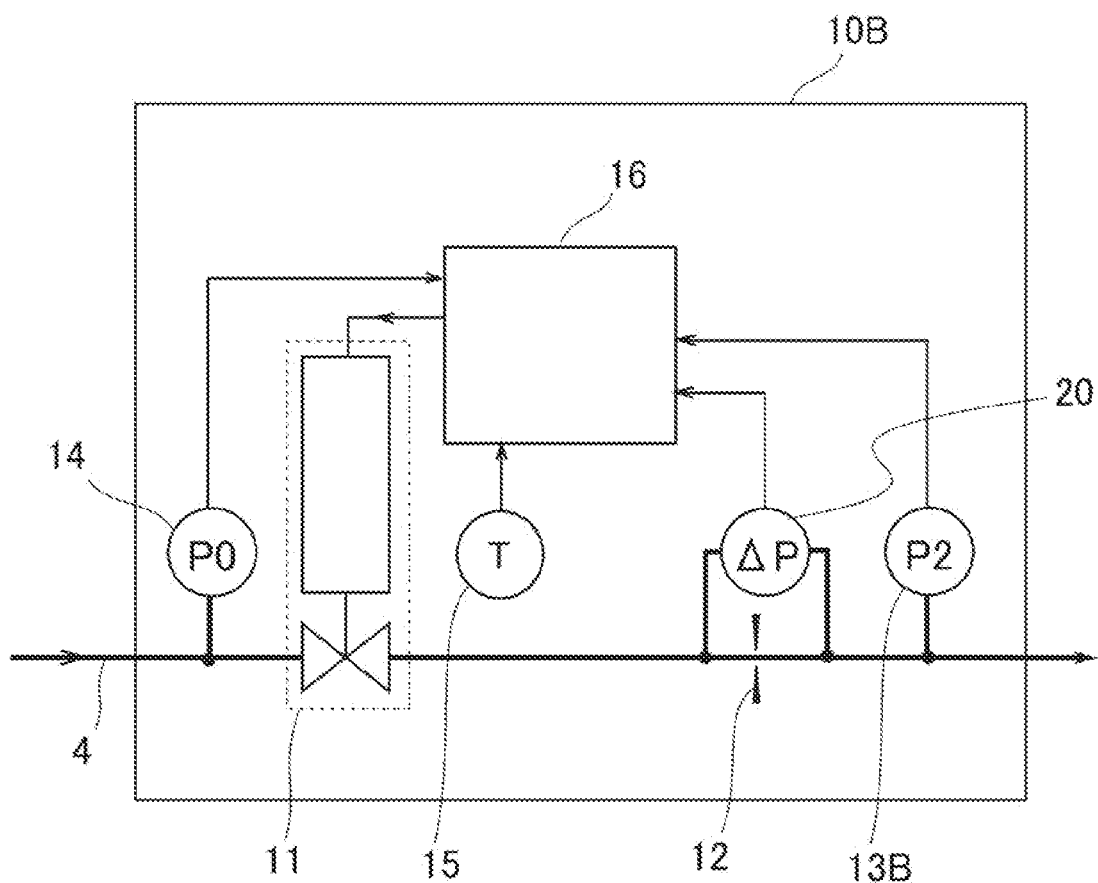
FIG. 11 is a diagram schematically showing a flow rate control device according to a further embodiment of the present invention.

FIG. 11 shows a flow rate control device 10B according to another embodiment. The flow rate control device 10B, as the same as the flow rate control device 10, including the control valve 11, the restriction part 12, the differential pressure sensor 20, the inflow pressure sensor 14, the temperature sensor 15, and the arithmetic control circuit 16. However, the flow rate control device 10B has a downstream pressure sensor 13B, instead of the upstream pressure sensor 13 of the flow rate control device 10.

Figure 12:
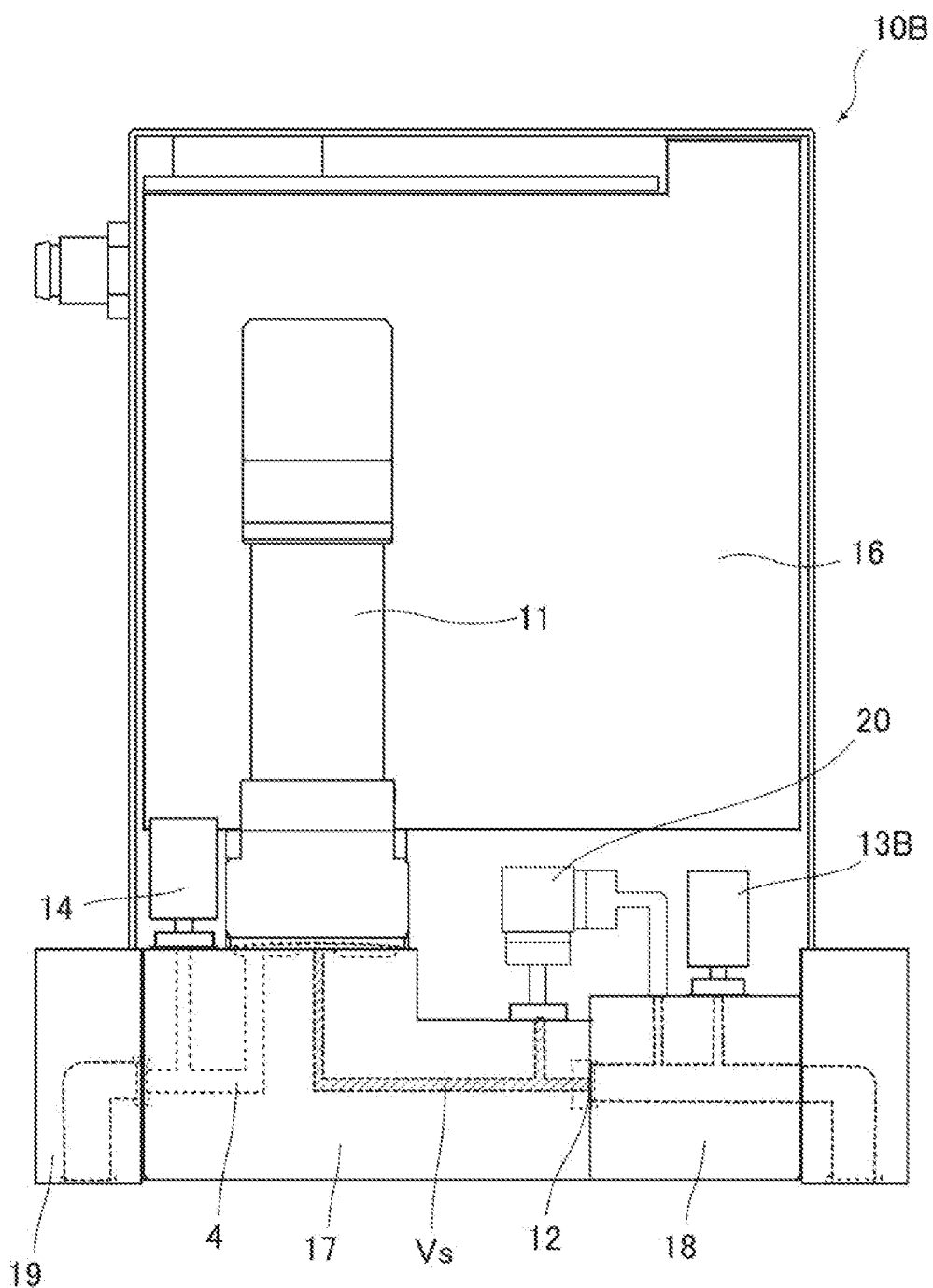
FIG. 12 is a side view showing a more specific configuration of a flow rate control device according to the further embodiment of the present invention.

FIG. 12 is a side view showing a specific configuration of the flow rate control device 10B. On the upper surface of the main body block 17, the inflow pressure sensor 14, the control valve 11, and the primary side port of the differential pressure sensor 20 are attached, and these are communicated with the upstream flow path of the restriction part 12. Further, the secondary port of the differential pressure sensor 20 is connected to the upper surface of the outlet block 18 and is communicated with the flow path downstream of the restriction part 12.

Moreover, in the flow rate control device 10B, the downstream pressure sensor 13B is fixed on the upper surface of the outlet block 18. The downstream pressure sensor 13B can measure the pressure (downstream pressure P2) of the flow path downstream of the restriction part 12. The downstream-pressure sensor 13B may include, for example, a silicon-single-crystal sensor chip and a diaphragm.

Also in this embodiment, the differential pressure sensor 20 is configured to directly measure the differential pressure ΔP between the pressure between the control valve 11 and the restriction part 12, with respect to the pressure downstream of the restriction part 12, the differential pressure is used for performing differential flow rate control. The differential pressure sensor 20 may have the same configuration as that of the above-described embodiment.

In the flow rate control device 10B, unlike the flow rate control device 10 shown in FIGS. 2 and 3, the upstream pressure sensor 13 is not provided. Therefore, the volume Vs between the control valve 11 and the restriction part 12 is further reduced. Thus, the gas flows out faster through the restriction part 12 after closing the control valve 11, even as compared with the flow rate control device 10, a fall response may be further improved.

Next, the flow rate control using the flow rate control device 10B will be described. The flow rate control device 10B is configured to control the flow rate of the gas flowing downstream of the restriction part 12 by using a differential pressure ΔP output by the differential pressure sensor 20, the downstream pressure P2 output by the downstream pressure sensor 13B.

The flow rate control device 10B determines whether it is under the critical expansion condition based on the differential pressure ΔP and the downstream pressure P2, for example, whether it is under the critical expansion condition or under the non-critical expansion condition is determined by whether or not the P2/(ΔP+P2) exceeded the threshold corresponding to the critical pressure ratio (e.g., 0.45), where ΔP1+P2 is the pressure corresponding to the upstream pressure P1. In the present specification, ΔP+P2 obtained by calculation may be referred to as the arithmetic upstream pressure P1'. In the present embodiment, whether or not it is under the critical expansion condition is determined by comparing the ratio between the arithmetic upstream pressure P1' and the downstream pressure P2 with a preset threshold value.

When it is determined under the critical expansion condition, the flow rate control device 10B performs flow rate control by proportional control based on the arithmetic upstream pressure P1'(=ΔP+P2), when it is determined under the non-critical expansion condition, the flow rate control device 10B performs flow rate control by differential pressure control based on the arithmetic upstream pressure P1' or the differential pressure ΔP, and the downstream pressure P2.

More specifically, under the critical expansion condition, proportional control is performed based on the flow rate $Qc = K1 \cdot (\Delta P + P2)$. Further, under the non-critical expansion condition, the differential pressure control is performed based on the flow rate $Qc = K2 \cdot P2^m (P1' - P2)^n = K2 \cdot P2^m \cdot \Delta P^n$. In the above equations, K1 and K2 are proportionality factors depending on the fluid species and the fluid temperature, and m and n are constants derived from the actual flow rate. The arithmetic control circuit 16 obtains the difference between the arithmetic flow rate Qc determined by the above equations and the input set flow rate Qs, then feedback control the opening degree of the control valve 11 to make the difference approaches 0. Thus, it is possible to flow the gas at a set flow rate Qs downstream the restriction part 12.

Further, in the flow rate control device 10B, the differential pressure control is the same as the method described in Patent Document 2, the arithmetic flow rate Qc may be obtained according to the following equation:

$$Qc = C1 \cdot P1' / \sqrt{T} \cdot ((P2/P1')^m - (P2/P1')^n)^{1/2} = C1 \cdot (\Delta P + P2)/\sqrt{T} \cdot ((P2/(\Delta P+P2))^m - (P2/(\Delta P+P2))^n)^{1/2}$$

In the above equation, C1 is a coefficient including the orifice cross-sectional area, P1 is the upstream pressure (Pa), T is the gas temperature (K), P2' is the arithmetic downstream pressure (Pa), m and n are constants derived from the actual flow rate.

The flow rate control device 10B of the present embodiment may adopt various known flow rate control systems described in Patent Document 2 or the like, except for using the arithmetic upstream pressure P1' instead of the upstream pressure P1 measured by the upstream pressure sensor, or except for using the differential pressure ΔP directly measured by a differential pressure sensor instead of using the (P1−P2) by calculated from the measured values of the upstream pressure sensor and the downstream pressure sensor.

Further, in the flow rate control device 10B, in a state where the downstream pressure P2 is considerably small (high vacuum state), when it is determined under the critical expansion condition, the differential pressure ΔP output from the differential pressure sensor 20 is regarded as the upstream pressure P1, the proportional control can also be performed on the basis of Qc=K1·ΔP. In addition, in the flow rate control device 10B, according to the same configuration as the integrated sensor shown in FIGS. 8 and 9, an integrated sensor integrating the differential pressure sensor 20 and the downstream pressure sensor 13B may be used.

Also in the flow rate control device 10B described above, since the differential pressure sensor 20 is used, the effect of zero-point drift that may occur in the pressure sensor is hardly reflected in the flow rate control, also, since both the proportional control and the differential pressure control can be performed, it is possible to accurately control the flow rate either under the critical expansion condition or non-critical expansion condition. Therefore, it is possible to appropriately perform the flow rate control over a wide control range.

INDUSTRIAL APPLICABILITY

The flow rate control device according to the embodiments of the present invention is preferably used to perform a flow rate control with high accuracy over a wide control range.

REFERENCE SIGNS LIST

1 Gas supply system
2. Gas supply source
3, 5. On-off valve
4 Flow path (gas supply line)
6 Process chamber
7 Vacuum pump
10 Flow rate control device
11 Control valve
12 Restriction part
13 Upstream pressure sensor
13B Downstream pressure sensor
14 Inflow pressure sensor
15 Temperature sensor
16 Arithmetic control circuit
17 Main body block
18 Outlet block
19 Inlet block
20 Differential pressure sensor
21 Primary side connection member
22 Secondary side connection member
23 Sensor body
30 Sensor chip
31 Pressure-sensing part
32 Strain sensor
35 Integrated sensor

The invention claimed is:

1. A flow rate control method comprising:
providing:
a control valve;
a restriction part provided downstream of the control valve;
a differential pressure sensor for directly measuring a differential pressure between the upstream side and the downstream side of the restriction part;
a downstream pressure sensor for measuring an absolute pressure downstream of the restriction part, the downstream pressure sensor being independent of the differential pressure sensor; and
an arithmetic control circuit connected to the control valve, the differential pressure sensor, and the downstream pressure sensor,
wherein the differential pressure sensor includes:
a primary-side connection member communicating with a flow path upstream of the restriction part;
a secondary-side connection member communicating with a flow path downstream of the restriction part; and
a sensor body connected to the primary-side connection member and the secondary-side connection member, the sensor body having a built-in sensor chip for measuring the differential pressure, and
the arithmetic control circuit is configured to perform a differential pressure control or a proportional control of the control valve based on the output of the differential pressure sensor and the output of the downstream pressure sensor,
determining an arithmetic flow rate in the differential pressure control according to an equation that $Qc=K2 \cdot P2^m \cdot \Delta P^n$ or $Qc=C1 \cdot (\Delta P+P2)/\sqrt{T} \cdot ((P2/(\Delta P+P2))^m - (P2/(\Delta P+P2))^n)^{1/2}$, where Qc is the arithmetic flow rate, ΔP is the differential pressure output by the differential pressure sensor, P2 is the downstream pressure output by the downstream pressure sensor, K2 is the proportional coefficient depending on the fluid species and fluid temperature, m and n are constants derived from the actual flow rate, C1 is the coefficient including the orifice cross-sectional area, T is the gas temperature,
determining an arithmetic flow rate in the proportional control by an equation that $Qc=K1 \cdot (\Delta P+P2)$, where Qc is the arithmetic flow rate and K1 is a proportional coefficient depending on a fluid species and a fluid temperature,
controlling the control valve so that the arithmetic flow rate becomes the set flow rate in the differential pressure control and the proportional control, and
calibrating zero-point drift of the differential pressure sensor before determining the arithmetic flow rate under a condition where a pressure of an upstream side of the differential pressure sensor and a pressure of a downstream side of the differential pressure sensor are the same.

2. The flow rate control method according to claim 1, wherein performing either the proportional control or the differential pressure control is determined by comparing a ratio of an arithmetic upstream pressure obtained by adding the output of the downstream pressure sensor to the output of the differential pressure sensor with respect to the output of the downstream pressure sensor, with a threshold value set in advance.

* * * * *